D. BEASLEY.
Evaporating Pan.
No. 40,378.
Patented Oct. 20, 1863.
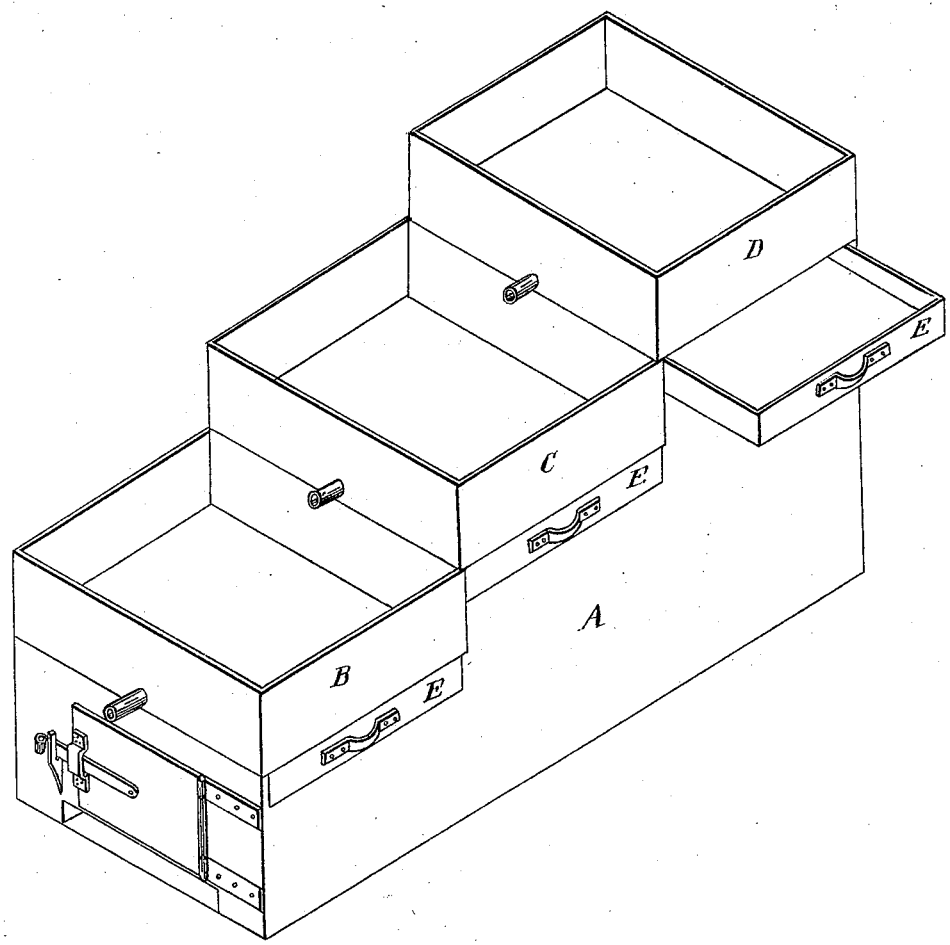
Witnesses:
O. F. Mayhew
Geo. A. Bowlus
Inventor:
David Bedeley.

UNITED STATES PATENT OFFICE.

DAVID BEASLEY, OF BOONE COUNTY, INDIANA, ASSIGNOR, BY MESNE ASSIGNMENTS, TO THOMPSON C. BARTLE, OF INDEPENDENCE, IOWA.

IMPROVED SUGAR-EVAPORATOR.

Specification forming part of Letters Patent No. 40,378, dated October 20, 1863.

*To all whom it may concern:*

Be it known that I, DAVID BEASLEY, of the county of Boone, and State of Indiana, have invented new and useful Improvements in Sugar-Evaporators; and I do hereby declare that the following is a full and exact description thereof, reference being had to the accompanying drawing, making part of this specification, in which is represented the evaporating-pans B C D, set upon brick-work A, which forms the furnace or fire-chamber.

E are shallow pans or drawers for holding water, to slide under the evaporating-pans.

The nature of my invention consists in arranging the pans of sugar-evaporators one above another, in such manner that the juice of the cane may be easily drawn off from the upper pans to those below in the several stages of its reduction to sirup or molasses, and in connection therewith the use of shallow pans or drawers for holding water, to slide under the evaporating-pans, and which serve as dampers to protect the bottoms of the pans from the direct action of the fire while the sirup or juice is being drawn off from one pan previous to being refilled from the pan above.

To enable others skilled in the art to make and use my invention, I will proceed to describe it.

I construct my evaporator-pans of sheet metal or cast-iron, preferring the latter, setting them on brick-work or furnaces, one above another, as clearly shown in the drawings, so that the lower forward edge of the second pan, C, rests on the upper rear edge of the first pan, B, and the forward edge of pan D rests in a similar manner on the rear upper edge of pan C. This arrangement of the pans makes the operation of drawing off the juice or sirup from an upper to a lower pan very easy and convenient, by means of the tubes F F F, which may be stopped with a plug of wood long enough to take hold of; or any convenient stop-cock may be used in their stead.

Shallow pans E E E, to hold water, are arranged to slide, like a drawer, under the evaporating-pans B C D, so that when any of the pans are emptied in the process of boiling down the juice into sirup, and also when the molasses is finally drawn off from the lower pan, B, into the cooler or other vessel, the bottoms of the pans so emptied are not exposed to the direct action of the fire, and thus all danger of scorching the sirup is prevented. By this means, also, pan C may be entirely emptied of its contents into pan B, and pan D entirely emptied of its contents into pan C, without any danger of the juice or sirup in one pan being intermingled with the juice or sirup of another pan, this precaution being quite essential to the production of a fine-flavored molasses or sugar, as if any of the juice in upper pan, D, which is undergoing the first process in evaporation and purification, should be mixed with the sirup in pan C, which is in the second or more forward state of evaporation and purification, the strong flavor of the green juice in pan D will impart, in some degree, its peculiar flavor to the sirup in pan C, and which cannot be easily deprived of it afterward, and will thus contaminate the entire batch of molasses or sugar with which it is mixed, and the same is also true in the event that the sirup in pan C is in any degree mixed with the sirup or molasses in pan B. These water-dampers allow the entire contents of one pan to be drawn off before the one above it is drawn into it. I have here shown three pans to be arranged and operated in this manner, as this number is deemed sufficient for the production of an excellent article of molasses or sugar; but any other number of evaporating-pans and water drawers or dampers may be arranged and operated in a similar manner.

The manner of operating this evaporator is very simple. From a tank for holding a supply of juice, which should be conveniently located for that purpose, the juice is let into the upper pan, D, to the depth of, say, about three inches. The water-dampers E E E being filled with water, those under the first and second pans, B and C, are shoved under the pans, while the damper under pan D is left drawn out. The fire is then lighted in the furnace, and the boiling in due time commences. When the juice is boiled and thoroughly skimmed of all the impurities that rise to the surface, the water-damper is then shoved under the pan and the purified juice drawn off by tube F into pan C, the damper under which is then drawn out.

The upper pan, D, is now refilled from the green juice from the supply-tank and the damper under this also drawn out, and the process of boiling and skimming again proceeds, as before mentioned, the juice or sirup in pan C being still further boiled, purified, and reduced to the proper consistency to be drawn off into pan B, into which it is then admitted by tube F. The damper under pan B being then drawn out, the process of reducing it to the consistency of molasses or sirup to be granulated into sugar begins and goes on until it is completed and ready to be drawn off into the cooler, and then barreled up as molasses, or put into shallow open pans to granulate, as may be desired.

It should be borne in mind that whenever any of the pans are to be emptied the damper under it must be shoved under the pan to prevent the bottom from being scorched.

Having thus fully described my invention, what I claim as new, and desire to secure by Letters Patent, is—

The combination and arrangement of the evaporating-pans B C D and water-dampers E E E, for the uses and purposes substantially as set forth.

DAVID BEASLEY.

Witnesses:
O. F. MAYHEW,
GEO. A. BOWLUS.